(12) United States Patent
Arnault et al.

(10) Patent No.: US 7,878,714 B2
(45) Date of Patent: Feb. 1, 2011

(54) CLUTCH RELEASE BEARING DEVICE

(75) Inventors: Benoît Arnault, Saint Cyr sur Loire (FR); Jean-Pierre Collognat, Plymouth, MI (US)

(73) Assignee: Aktiebolaget SKF, Göteborg (SE)

( * ) Notice: Subject to any disclaimer, the term of this patent is extended or adjusted under 35 U.S.C. 154(b) by 749 days.

(21) Appl. No.: 10/965,679

(22) Filed: Oct. 14, 2004

(65) Prior Publication Data
US 2005/0265646 A1    Dec. 1, 2005

(30) Foreign Application Priority Data
Oct. 14, 2003    (FR)    ................... 03 11989

(51) Int. Cl.
*F16C 19/10*    (2006.01)
*F16D 19/00*    (2006.01)
(52) U.S. Cl. .................. 384/612; 384/607; 192/98; 192/110 B
(58) Field of Classification Search ............. 384/477, 384/484, 485, 607, 612; 192/98, 110 B
See application file for complete search history.

(56) References Cited

U.S. PATENT DOCUMENTS

| | | | |
|---|---|---|---|
| 4,029,186 A | 6/1977 | De Gennes | |
| 4,046,238 A | 9/1977 | Mendoza-Orozco | |
| 4,319,220 A | 3/1982 | Pappas et al. | |
| 4,365,850 A * | 12/1982 | Perrichot et al. ............. | 384/611 |
| 4,478,595 A | 10/1984 | Hayakawa et al. | |
| 4,601,374 A | 7/1986 | Ladin | |
| 4,608,741 A | 9/1986 | Mallet | |
| 4,641,523 A | 2/1987 | Andreasson | |
| 4,699,530 A | 10/1987 | Satoh et al. | |
| 4,815,867 A | 3/1989 | Ladin | |
| 4,854,436 A | 8/1989 | Lassiaz et al. | |
| 4,872,768 A | 10/1989 | Brandenstein et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |

(Continued)

FOREIGN PATENT DOCUMENTS

DE    4228899    3/1994

(Continued)

OTHER PUBLICATIONS

Preliminary Search Report for FR 0307356 mailed on Nov. 23, 2003 (2 pages).

(Continued)

*Primary Examiner*—Thomas R Hannon
*Assistant Examiner*—James Pilkington
(74) *Attorney, Agent, or Firm*—Meyertons, Hood, Kivlin, Kowert & Goetzel, P.C.; Eric B. Meyertons

(57) ABSTRACT

Clutch release bearing device, including an operating element, a rolling bearing furnished with rolling elements, with a non-rotating ring provided with a radial portion facing inwards and having a central opening, and with a rotating ring, the said rolling bearing being mounted on the operating element with which it may move axially, and a self-alignment sleeve placed between the non-rotating ring and the operating element and provided with a plurality of elastic ribs facing inwards.

8 Claims, 3 Drawing Sheets

U.S. PATENT DOCUMENTS

| | | | |
|---|---|---|---|
| 5,008,647 A | 4/1991 | Brunt et al. |
| 5,018,384 A | 5/1991 | Hayashi et al. |
| 5,033,013 A | 7/1991 | Kato et al. |
| 5,264,790 A | 11/1993 | Moretti et al. |
| 5,372,435 A | 12/1994 | Genero et al. |
| 5,575,568 A | 11/1996 | Rigaux et al. |
| 5,592,401 A | 1/1997 | Kramer |
| 5,598,913 A | 2/1997 | Monahan et al. |
| 5,713,577 A | 2/1998 | Lannert et al. |
| 5,721,539 A | 2/1998 | Goetzl |
| 5,780,731 A | 7/1998 | Matsui et al. |
| 5,845,230 A | 12/1998 | Lamberson |
| 5,865,288 A | 2/1999 | Thomire et al. |
| 5,877,431 A | 3/1999 | Hirano |
| 6,011,491 A | 1/2000 | Goetzl |
| 6,013,007 A | 1/2000 | Root et al. |
| 6,035,990 A | 3/2000 | Peschke |
| 6,043,643 A | 3/2000 | Message et al. |
| 6,056,446 A | 5/2000 | Welter et al. |
| 6,109,624 A | 8/2000 | Message et al. |
| 6,160,480 A | 12/2000 | Su-yueh |
| 6,196,552 B1 | 3/2001 | Peterson et al. |
| 6,267,512 B1 | 7/2001 | Beghini et al. |
| 6,323,640 B1 | 11/2001 | Forestiero et al. |
| 6,338,576 B1 | 1/2002 | Girardin et al. |
| 6,415,900 B1 | 7/2002 | Lopez et al. |
| 6,464,060 B1 * | 10/2002 | Ponson et al. ................. 192/98 |
| 6,539,336 B1 | 3/2003 | Vock et al. |
| 6,611,138 B2 | 8/2003 | Vasiloiu |
| 6,612,749 B2 * | 9/2003 | Arnault et al. ............... 384/607 |
| 6,666,784 B1 | 12/2003 | Iwamoto et al. |
| 6,702,085 B1 * | 3/2004 | Ponson ........................ 192/98 |
| 6,746,352 B1 | 6/2004 | Poiret et al. |
| 6,908,229 B2 | 6/2005 | Landrieve et al. |
| 2002/0097940 A1 * | 7/2002 | Arnault et al. ............... 384/612 |
| 2003/0000276 A1 | 1/2003 | Pflugner et al. |
| 2003/0007631 A1 | 1/2003 | Bolognesi et al. |
| 2004/0013334 A1 | 1/2004 | Landrieve et al. |
| 2004/0141669 A1 | 7/2004 | Landrieve et al. |
| 2004/0154895 A1 | 8/2004 | Thomire et al. |
| 2004/0202392 A1 | 10/2004 | Niarfeix et al. |
| 2005/0008276 A1 | 1/2005 | Beghini et al. |
| 2005/0089255 A1 | 4/2005 | Debrailly et al. |
| 2005/0124447 A1 | 6/2005 | Message et al. |
| 2005/0165397 A1 | 7/2005 | Faus et al. |
| 2005/0235513 A1 | 10/2005 | Niarfeix |
| 2005/0265646 A1 | 12/2005 | Arnault |
| 2006/0011445 A1 | 1/2006 | Bussit et al. |
| 2006/0104558 A1 | 5/2006 | Gallion et al. |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10042677 | 3/2002 |
| DE | 10148388 | 4/2003 |
| EP | 0399855 | 11/1990 |
| EP | 0 511 105 | 10/1992 |
| EP | 511105 | 10/1992 |
| EP | 520853 | 12/1992 |
| EP | 0806581 | 11/1997 |
| EP | 823267 | 2/1998 |
| EP | 930505 | 7/1999 |
| EP | 0 992 797 | 4/2000 |
| EP | 992797 | 4/2000 |
| EP | 1146244 | 10/2001 |
| FR | 2 375 484 | 12/1977 |
| FR | 2577291 | 8/1986 |
| FR | 2602872 | 2/1988 |
| FR | 2611244 | 8/1988 |
| FR | 2655735 | 6/1991 |
| FR | 2688560 | 9/1993 |
| FR | 2772444 | 6/1999 |
| FR | 2819864 | 7/2002 |
| GB | 1580301 | 12/1980 |
| GB | 2054084 | 2/1981 |
| JP | 6213251 | 8/1994 |
| WO | WO01/18419 * | 3/2001 |
| WO | 02052163 | 7/2002 |
| WO | 02052280 | 7/2002 |

OTHER PUBLICATIONS

Preliminary Search Report for FR 0307355 mailed on Nov. 24, 2003 (2 pages).
Preliminary Search Report for FR 0311989 mailed on Feb. 24, 2004 (2 pages).
U.S. Appl. No. 10/870,484 entitled "Clutch Release Bearing and Method of Assembly" filed Jun. 17, 2004 (21 pages, including cover sheet and drawings).
U.S. Appl. No. 10/870,483 entitled "Clutch Release Bearing" filed Jun. 17, 2004 (21 pages including cover sheet and drawings).
U.S. Appl. No. 10/520,384, filed Jan. 3, 2005, entitled "Instrumented Antifriction Bearing and Electrical Motor Equipped Therewith" to Gallion et al.
U.S. Appl. No. 10/548,866, filed Sep. 9, 2005, entitled "Sensor Unit, and Housing Relay for the Production of Said Unit" to Landrieve.
U.S. Appl. No. 10/551,167, filed Sep. 27, 2005, entitled "Portable Measuring Device for Use in Sport" to Franck.
U.S. Appl. No. 10/552,375, filed Jan. 18, 2005, entitled "Freewheel Bearing Device and Freewheel Pulley" to Girardin.
U.S. Appl. No. 10/562,476, filed Dec. 21, 2005, entitled "Bearing Support With an Instrumented Movement and Coder for an Information Recorder Unit" to Gallion.
English translation of DE 10011820 (1 page).
English translation of DE 10042677 (1 page).
English translation of DE 10148388 (1 page).
English translation of DE 19637585 (1 page).
English translation of DE 29708535 (1 page).
English translation of EP 399855 (1 page).
English translation of EP 511105 (1 page).
English translation of EP 520853 (1 page).
English translation of EP 823267 (1 page).
English translation of FR 2577291 (1 page).
English translation of FR 2602872 (1 page).
English translation of FR 2611244 (1 page).
English translation of FR 2655735 (1 page).
English translation of FR 2688560 (1 page).
English translation of FR 2772444 (1 page).
English translation of FR 2819864 (1 page).

* cited by examiner

CLUTCH RELEASE BEARING DEVICE

BACKGROUND OF THE INVENTION

1. Field of the Invention

The present invention relates to the field of clutch release bearings, in particular for automobiles, of the type including a thrust rolling bearing mounted on an operating element.

2. Description of the Relevant Art

French document No. 2 819 864 is known to describe a clutch release bearing including a leading element mounted on an operating element. The leading element includes a bearing provided with a rotating ring and a non-rotating ring capable of moving radially relative to the operating element for its self-alignment relative to the clutch diaphragm. The non-rotating ring includes a radial portion facing inwards. The device includes a means of axially interlocking the leading element on the operating element in the form of a lock washer. The device includes a self-alignment element in the form of a sheet metal piece, centered on the non-rotating ring and provided with axially elastic tabs, such that the said self-alignment element exerts axial pressures in opposite directions on the lock washer and on the non-rotating ring and keeps the non-rotating ring in permanent axial contact with a radial bearing surface of the operating element.

The number of pieces that comprise such a device is quite high which involves considerable assembly costs.

Document JP A 6-213251 shows a clutch release bearing including an outer non-rotating ring provided with an inward-facing radial branch between the balls and a radial collar of an operating element, a metal flange provided with a large diameter axial portion partially surrounding the said ring, a radial portion placed between the radial branch of the said ring and the radial collar of the operating element, and a small diameter axial portion, and a flexible sleeve supported by the small diameter axial portion and extending from the radial branch of the said ring to beyond the radial plane passing through the center of the balls.

Such a clutch bearing is axially bulky while being costly and difficult to assemble.

SUMMARY OF THE INVENTION

Described herein is an economic clutch release bearing, easy to assemble, compact and furthermore providing an excellent transverse seal for the thrust bearing, this seal retaining its full effectiveness irrespective of the radial movement of the bearing relative to the operating element during the self-centering of the bearing.

Described herein is are clutch release bearings, in particular for automobiles, of the type including a thrust rolling bearing mounted on an operating element. The operating element is actuated mechanically or hydraulically in order to move the rolling-contact bearing axially so that the latter acts via its rotating ring on the fingers of a clutch diaphragm and thus makes it operate.

In an embodiment, clutch release bearings in which an elastic self-alignment element is placed between the non-rotating ring of the thrust bearing and the operating element supporting the said thrust bearing in order to allow a radial movement of the bearing relative to the operating element in order to allow the self-alignment of the bearing on the diaphragm, while providing an axial interlocking of the bearing and the operating element are described.

In an embodiment, clutch release bearings including a bearing provided with rings of pressed sheet steel, the outer ring and the inner ring each being provided with a radial portion facing inwards, offset axially one from the other and each including a circular central opening, the central opening of the non-rotating ring being of smaller diameter than the diameter of the central opening of the outer ring are described.

This bearing structure allows the said push-rod-end bearing to be provided with a hydraulic control device for example without waste of space in the axial direction since a part of the push-rod is housed in the thrust bearing.

The clutch release bearing device is of the type including an operating element, a rolling bearing furnished with a non-rotating ring and a rotating ring, the said non-rotating ring being provided with a radial portion facing inwards and having a central opening, the said rolling bearing being mounted on the operating element with which it may move axially, and a self-alignment sleeve placed between the non-rotating ring and the operating element and provided with a plurality of elastic splines facing inwards. The self-alignment sleeve includes an axial portion adjusted in the central opening of the radial portion of the non-rotating ring, and a radial portion facing outwards and pressing axially against the inward-facing radial portion of the non-rotating ring. The elastic splines are placed relative to a plane passing through the center of the rolling elements on the same side as a bearing face of the rotating ring on a diaphragm, and extending axially over a part of the space delimited by a radial plane passing through the bearing face of the rotating ring on a diaphragm and by a radial plane passing through the bearing face of the non-rotating ring on the operating element. The sleeve is extremely compact axially and rests in a radial space defined by a dummy cylinder flush with the raceway of the inner ring.

In one embodiment, the self-alignment sleeve includes a rigid brace and a flexible body, the elastic splines being made in one piece with the said body. The body may be overmolded on the brace. The sleeve then forms one piece that cannot be removed and is easy to manipulate before and during assembly.

In one embodiment, the self-alignment sleeve includes a metal brace provided with a central axial portion and a radial portion. The metal brace may be in contact with the non-rotating ring by its central axial portion and its radial portion. The metal brace may be inserted into the central opening of the radial portion of the non-rotating ring. The insertion is made over a length at least equal to the thickness of the non-rotating ring.

In one embodiment, the self-alignment sleeve includes a second axial portion forming a narrow passage with the rotating ring. The second axial portion may be formed on the brace. The second axial portion may be formed from the body with which it is made in one piece.

In one embodiment, the self-alignment sleeve includes a sealing lip interacting with the rotating ring. The sealing lip may interact with a circular axial surface of the rotating ring formed by the bore of a radial portion facing towards the interior of the rotating ring. The sealing lip may interact with a radial surface of the rotating ring formed on a radial portion of the rotating ring facing inwards. The sealing ring may be made in one piece with the body of the sleeve. Thus the sleeve also performs a sealing function.

Advantageously, the rotating ring and the non-rotating ring have a substantially constant thickness. The rings may be made of pressed sheet steel.

The clutch release leading element, according to one embodiment, is intended to be mounted on an operating element to form a clutch release device. The leading element includes a thrust rolling bearing provided with a non-rotating ring and a rotating ring, and a self-alignment sleeve including a plurality of inward facing elastic splines. The non-rotating ring is provided with a radial portion facing inwards and having a central opening, the self-alignment sleeve including an axial portion adjusted in the central opening of the radial portion of the non-rotating ring, and a radial portion facing outwards and bearing axially against the inward facing radial portion of the non-rotating ring. Such a leading element is easy to manipulate and mount on an operating element.

Such a clutch release bearing is of simple structure, the sleeve being a single piece and providing the link between the operating element and the leading element.

BRIEF DESCRIPTION OF THE DRAWINGS

The present invention will be better understood and other advantages will appear on reading the detailed description of some embodiments taken as non-limiting examples and illustrated by the appended drawings in which.

Figure 1:
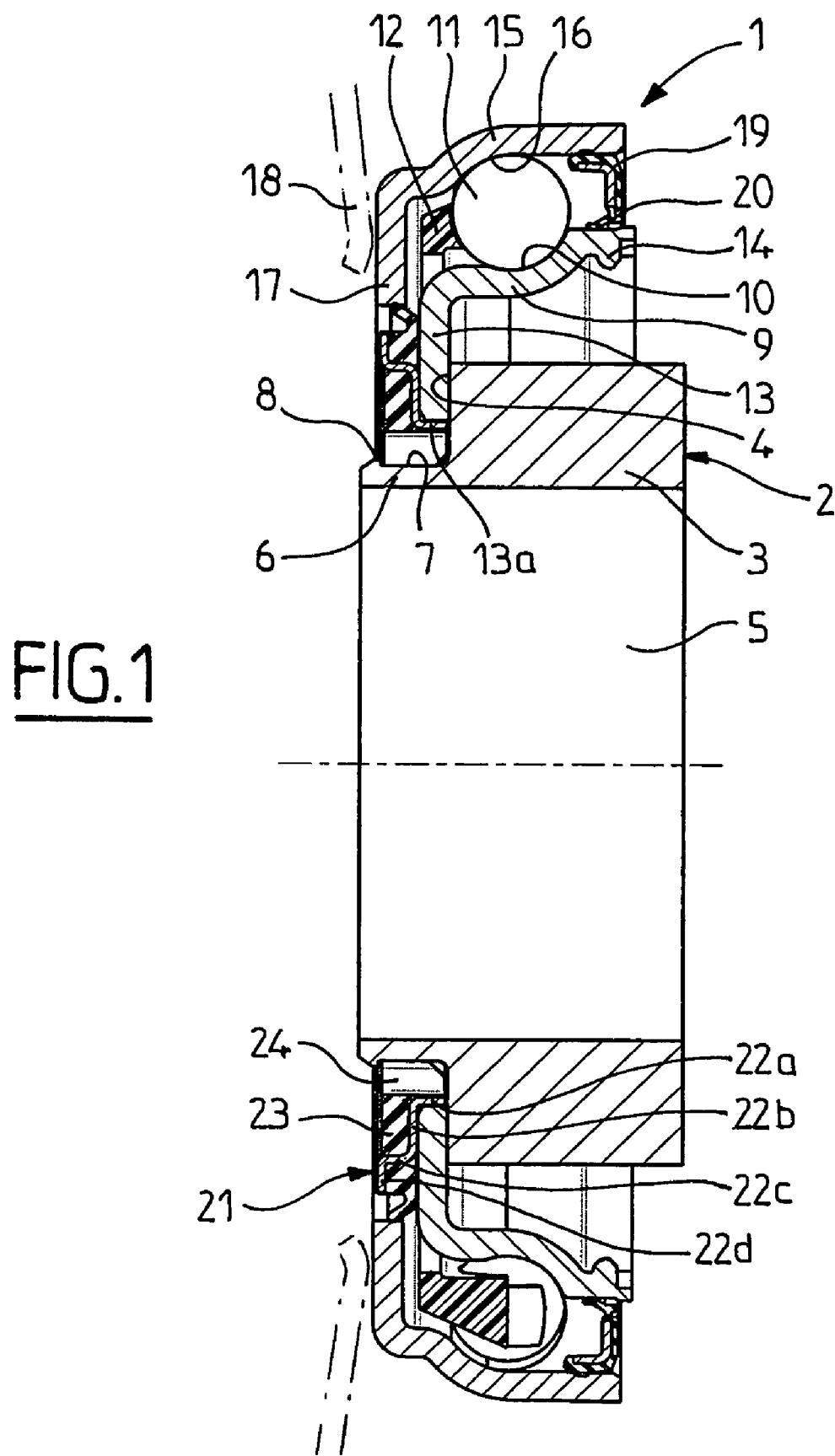
FIG. 1 is a half-view in axial section of a clutch release bearing device.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
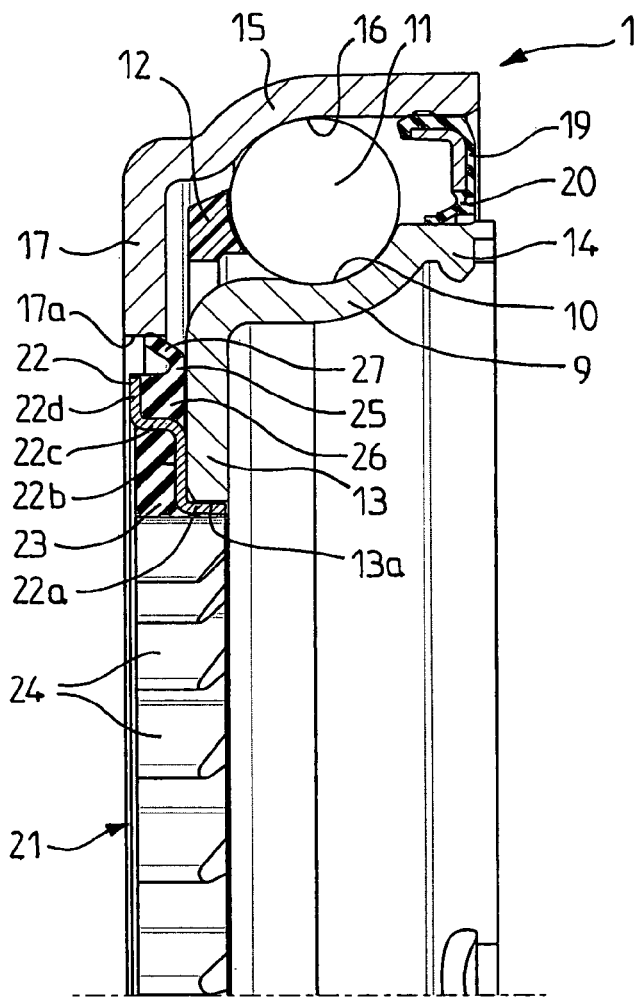
FIG. 2 is a half-view in axial section of the leading element in FIG. 1.
Figure 3:
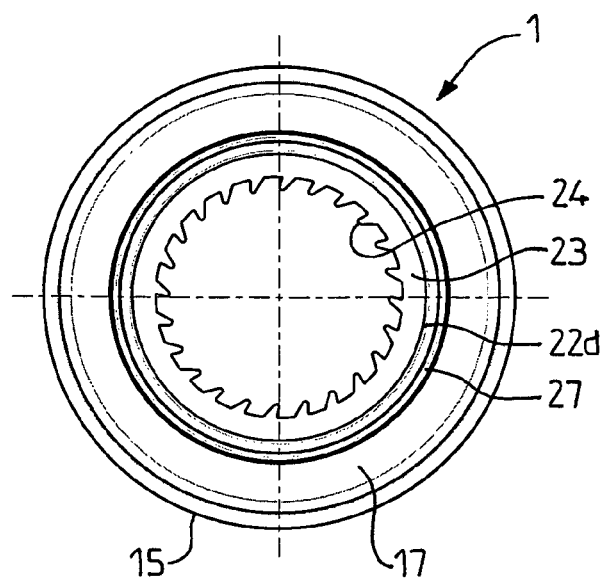
FIG. 3 is a front view in elevation of the leading element in FIG. 2.

As illustrated in FIGS. 1 to 3, the clutch release bearing includes a rolling bearing 1 mounted on an operating element 2, advantageously made of synthetic material and including a cylindrical body 3 and a radial bearing surface 4. The operating element 2 may for example have the shape of a piston of a hydraulic clutch-operating device or of a separate push rod axially extending the said piston. The operating element 2 is usually mounted by its bore 5 onto a stationary guide-tube not shown, while the said operating element 2 is capable of moving in translation along the axis of the guide-tube. A free end of the operating element 2 includes a cylindrical portion 6 of lesser thickness than the cylindrical body 3 and provided with an outer surface 7. The radial bearing surface 4 is placed axially between the cylindrical body 3 and the cylindrical portion 6. A retention element 8 in the form of an annular rib facing outwards is formed on the outer surface 7 axially opposite the radial surface 4.

The rolling bearing 1 includes an inner, non-rotating ring 9 with a thin wall made by pressing of a metal sheet or of a tube and having an annular raceway 10 for a row of rolling elements 11 kept regularly spaced from one another in the circumferential direction by a cage 12. The inner ring 9 also includes an extension facing inwards in the form of a radial portion 13 having a bore 13a and a cylindrical extension 14 on the side opposite the radial portion 13 relative to the row of balls. The radial portion 13 is in contact with the radial surface 4 of the operating element 2.

The rolling bearing 1 is supplemented by an outer rotating ring 15 also with a thin wall made by pressing a metal sheet or a tube and which has an annular raceway 16 for the rolling elements 11, and a radial portion 17 facing inwards which comes into contact with the surface of a diaphragm 18 of a clutch device in order to actuate it when the clutch release bearing assembly supported by the operating element 2 is moved axially. The rolling bearing 1 is protected on the side opposite the diaphragm 18 by a sealing element 19 attached in the bore of the outer ring 15 and having a lip 20 coming into friction contact with the cylindrical extension 14 of the inner ring 9.

The clutch release bearing is supplemented by a self-alignment element 21 in the form of an elastic sleeve. The self-alignment element 21 includes a metal brace 22 made of thin sheet metal and having an annular form with a small diameter axial portion 22a adjusted in the bore 13a of the radial portion 13 of the non-rotating ring 9, the bore 13a being formed in the thickness of the said radial portion 13. A small diameter radial portion 22b extends the axial portion 22a outwards and extends in contact with the face of the radial portion 13 of the non-rotating ring 9 situated on the side of the diaphragm 18. The small diameter radial portion 22b extends over a part of the radial height of the radial portion 13, for example, over approximately ⅓ to ⅔.

The brace 22 includes a large diameter axial portion 22c extending towards the diaphragm 18 from the large diameter end of the radial portion 22b, and a large diameter radial portion 22d extending outwards from the end of the large diameter axial portion 22c axially adjacent to the diaphragm 18. The large diameter radial portion 22d is flush with the radial plane passing through the outer face of the radial portion 17 of the non-rotating ring 15. This avoids an increase in the axial bulk of the thrust bearing.

The self-alignment element 21 is supplemented by a body 23 made of synthetic material, for example of elastomer or of rubber, and attached to the brace 22, for example by over-moulding. The body 23 has a globally rectangular section with two opposite radial faces one of which is in contact with the small diameter radial portion 22b of the brace 22 and the other is flush with the radial plane of the outer face of the radial portion 17 of the rotating ring 15. The body 23 is also delimited by an outer surface in contact with the bore of the large diameter axial portion 22c of the brace 22 and by a bore. From the bore of the body 23 a plurality of splines 24 extend facing radially inwards and inclined circumferentially, coming into contact with the outer surface 7 of the reduced thickness cylindrical portion 6 of the operating element 2.

In addition, the splines 24 are retained axially by the annular rib 8 formed at the free end of the outer surface 7. The radial interference between the rib 8 and the splines 24 provides an axial interlocking between the operating element 2 and the self-alignment element 21 and therefore with the rolling bearing 1. The axial splines 24 extend axially between the radial plane passing through the outer face of the radial portion 17 of the rotating ring 15 in contact with the diaphragm 18 and the radial surface 4 of the operating element 2.

The self-alignment element 21 also includes a seal 25 including a heel 26 and a lip 27 advantageously made of the same material and at the same time as the body 23. The heel 26 surrounds the large diameter axial portion 22c of the brace 22 and is delimited axially between the large diameter radial portion 22d of the brace 22 and the radial portion 13 of the non-rotating ring 9. The sealing lip 27 extends outwards and comes into sliding contact with the bore 17a of the radial portion 17 of the rotating ring 15, the said bore 17a being formed by the thickness of the radial portion 17, blocking off the annular space between the rings 9 and 15.

In this way, a self-alignment element is made in a single piece, easy to mount on the non-rotating ring by a simple axial fitting movement and particularly compact axially and radially. It is notable in particular that the self-alignment element 21 fits entirely between the radial plane of contact of the diaphragm 18 with the non-rotating ring 15 and the radial plane passing through the center of the rolling elements 11. More particularly, the axial end of the self-alignment element 21 close to the rolling elements 11 is flush with a radial plane tangential to the rolling elements, on the side of the rolling elements 11 situated closest to the diaphragm 18.

Figure 4:
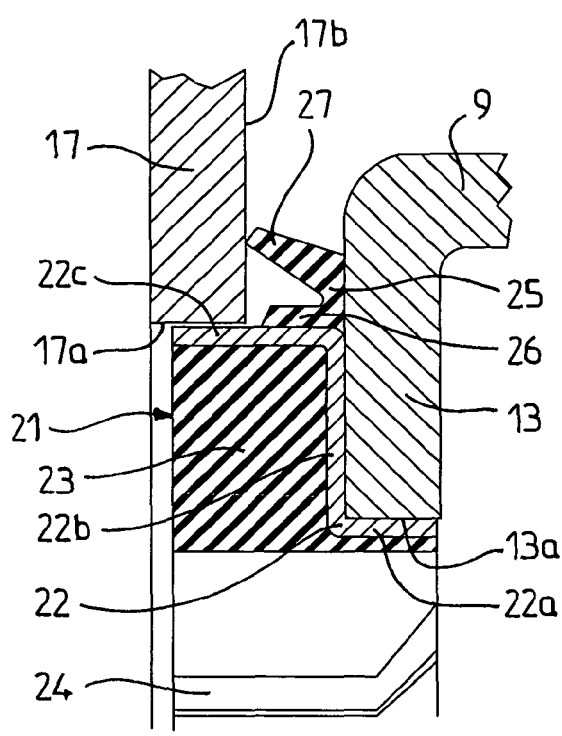
FIGS. 4-7 are detailed views showing sleeve variants.

FIG. 4 illustrates one embodiment similar to the preceding one except that the brace 22 has no large diameter radial portion, the large diameter axial portion 22c forming a narrow passage with the bore 17c of the radial portion 17 of the rotating ring 15. The seal 25 is placed on the periphery of the said large diameter axial portion 22c and radially between the radial portion 17 of the rotating ring 15 and the radial portion 13 of the non-rotating ring 9. The sealing lip 27 comes into sliding contact with the internal face 17b of the radial portion 17 of the rotating ring 15 on the side of the rolling elements. In addition, the seal 25 is in contact with the radial portion 13 of the non-rotating ring 9 and thus provides a static seal.

Figure 5:
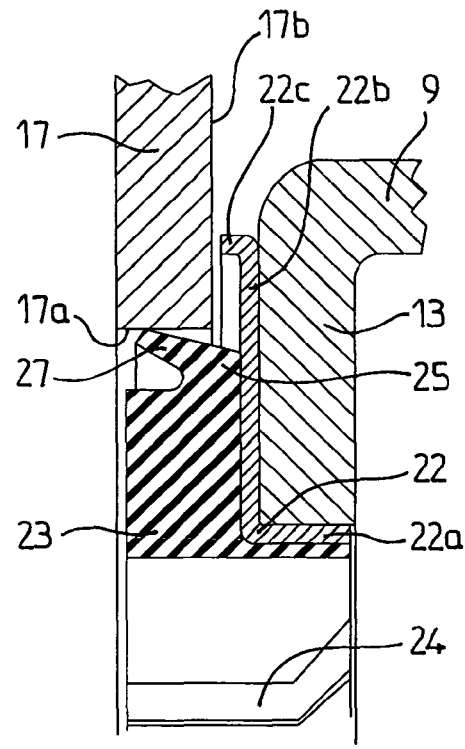

In the embodiment illustrated in FIG. 5, the brace 22 includes a short, large diameter axial portion 22c placed axially between the radial portion 17 and the radial portion 13 and forming a narrow passage with the internal face 17b of the radial portion 17. The radial portion 22b of the brace 22 here has an external diameter greater than the bore 17a of the radial portion 17. The seal 25 is made in one piece with the body 23, the function of the heel being provided by the said body 23. The sealing lip 27 comes into sliding contact with the bore 17a of the radial portion 17. The body 23 must have a radial thickness sufficient to avoid an excessive pressure of the sealing lip 27 because of the possible deformation of the body 23 under the pressure of the splines 24.

Figure 6:
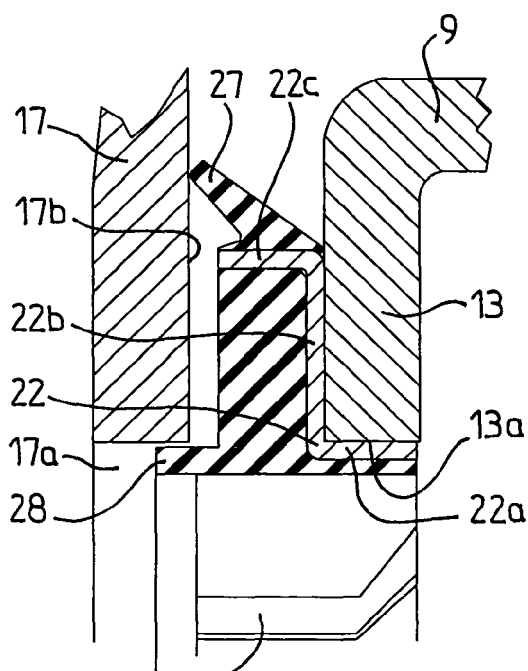

In the embodiment illustrated in FIG. 6, the large diameter axial portion 22c of the brace 22 is placed axially between the radial portion 17 of the rotating ring 15 and the radial portion 13 of the rotating ring 9. The radial portions 13 and 17 have bores of similar diameter. The body 23 is therefore mostly placed between the radial portions 13 and 17. The body 23 includes, in addition, close to its bore, an annular rib 28 projecting axially towards the diaphragm and forming a narrow passage with the bore 17a of the radial portion 17 of the rotating ring 15.

The embodiment in FIGS. 4 to 6 therefore shows a self-alignment element fitted with two sealing means, one by narrow passage, and the other friction, which further increases the overall effectiveness of the seal of the rolling bearing.

Figure 7:
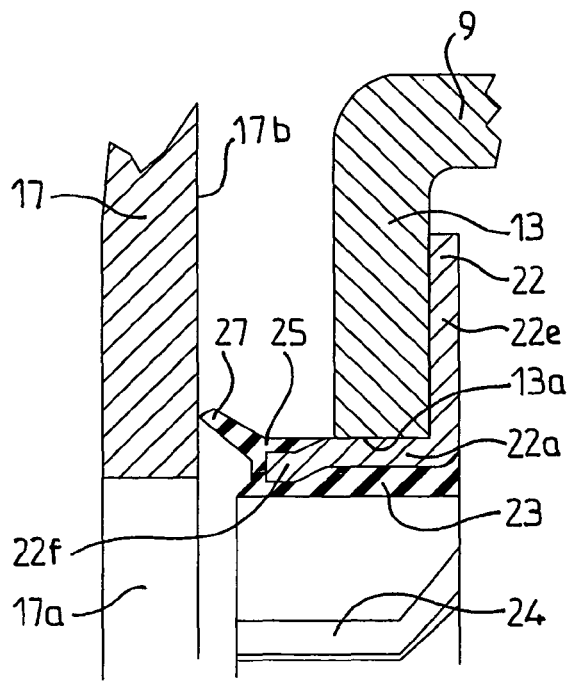

In the embodiment illustrated in FIG. 7, the brace 22 includes an axial portion 22a fitted into the bore 13a of the radial portion 13 of the non-rotating ring 9, a radial portion 22e facing outwards from the end of the axial portion 22a opposite the radial portion 17 and extending over a part of the length of the radial portion 13 while being in contact with the latter. The brace 22 is supplemented by a rim 22f situated in the extension of the axial portion 22a, on the side opposite the radial portion 22e and slightly bent inwards. The body 23 and the seal 25 are made in one piece, the body 23 covering the inner surface of the portions 22a and 22f of the brace 22 and the seal 25 covering the free end and the periphery of the portion 22f. The portions 22a and 22f provide the rigidity of the body 23. The sealing lip 27 extends outwards towards the face 17b of the radial portion 17 situated opposite the radial portion 13. The elastic splines 24 are formed from the bore of the body 23. Naturally, as a variant, additional sealing can be provided by a friction seal on the bore 17a or yet by narrow passage. The shape of the brace 22 is here particularly simple and hence low cost.

In this embodiment, when the rolling bearing is mounted on the operating element 2, the radial portion 22 is axially sandwiched between the radial portion 13 of the inner ring 9 and the radial bearing surface 4 of the operating element.

An embodiment provides a self-alignment sleeve an axial part of which is in contact with the bore of a radial portion of the non-rotating ring while a radial portion is in contact with the radial surface of the same radial portion of the non-rotating ring to form a compact element performing the functions of elastic self-alignment and sealing by the mounting of a single piece including a metal brace and a flexible part and involving an axially delimited space on the side of the diaphragm by the radial plane passing through the diaphragm zone of contact with the rotating ring and on the side of the rolling elements by a radial plane passing through the center of the rolling elements. Thus the benefit is a sleeve with elastic splines which provides an excellent self-alignment and a high reliability while benefiting from a greatly reduced axial bulk.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A clutch release bearing device comprising:

an inner non-rotating ring made by pressing of a metal sheet or a tube having an annular raceway for a row of rolling elements and an extension facing inwards in the form of a radial portion having a bore defining a first circular central opening, said radial portion being configured to couple with a radial surface of an operating element;

an outer rotating ring made by pressing of a metal sheet or of a tube having an annular raceway for said row of rolling elements and a radial portion facing inwards configured to couple with a surface of a diaphragm of the clutch device and defining a second circular central opening;

an elastic sleeve element including a sheet metal brace, a body of synthetic material with a plurality of splines extending radially inwards, configured to couple with an outer surface of said operating element; and a sealing portion with a sealing lip that seals at least a portion of said second circular central opening by contacting an inwardly facing end surface of said radial portion of the outer rotating ring;

said sheet metal brace comprising a first axial portion contacting said bore of said radial portion of said inner non-rotating ring, a radial portion extending from an end of the first axial portion and contacting said radial portion of said inner non-rotating ring, and a second axial portion extending from said radial portion and extending through at least a portion of the body of synthetic material;

wherein said elastic sleeve element is made of a single piece comprised of said sheet metal brace, said body of synthetic material overmolded on said brace, and said sealing portion; and said single piece fitting entirely between a radial plane of contact of the diaphragm of the clutch device with the said outer rotating ring and a radial plane passing through the center of the rolling elements.

2. The device according to claim 1, wherein the outer rotating ring and the inner non-rotating ring have a substantially constant thickness.

3. A clutch release bearing device comprising:

an operating element;

a rolling bearing mounted on the operating element with which it may move axially, the rolling bearing comprising:

rolling elements, a non-rotating ring made by metal sheet pressing, said non-rotating ring being provided with a contact face on the operating element and a radial portion facing inwards and having a central opening, a rotating ring made by metal sheet pressing, said rotating ring having a contact face on a diaphragm and a radial portion facing inwards and having a central opening; and a self-alignment sleeve, comprising a body of synthetic material, placed between the non-rotating ring and the operating element and provided with a plurality of elastic splines facing inwards, the self-alignment sleeve further comprising:

an axial portion adjusted in the central opening of the radial portion of the non-rotating ring, a radial portion facing outwards and pressing axially against a part of the inward-facing radial portion of the non-rotating ring, said radial portion having an inside face and an outside face, the elastic splines being overmolded on said inside face of said radial portion and placed relative to a plane passing through the center of the rolling elements on the same side as the contact face of the rotating ring on the diaphragm, and extending axially over at least a part of the space delimited by a radial plane passing through the contact face of the rotating ring on the diaphragm and by a radial plane passing through the contact face of the non-rotating ring on the operating element;

a sealing portion overmolded on said outside face of said radial portion with a sealing lip that seals at least a portion of the central opening of the radial portion of the rotating ring by contacting an inwardly facing end surface of the radial portion of the rotating ring; and a sheet metal brace comprising a first axial portion contacting said central opening of said non-rotating ring, a radial portion extending from an end of the first axial portion and contacting said radial portion of said non-rotating ring, and a second axial portion extending from said radial portion and extending through at least a portion of the body of synthetic material.

4. A clutch release bearing device comprising:

an inner non-rotating ring having an annular raceway for a row of rolling elements and an extension facing inwards in the form of a radial portion having a bore defining a first central opening, said radial portion being configured to couple with a radial surface of an operating element;

an outer rotating ring having an annular raceway for said row of rolling elements and a radial portion facing inwards configured to couple with a surface of a diaphragm of the clutch device and defining a second central opening;

an elastic sleeve element including a sheet metal brace, a body of synthetic material with a plurality of splines extending radially inwards, configured to couple with an outer surface of said operating element; and a sealing portion with a sealing lip that seals at least a portion the second central opening by contacting an inwardly facing end surface of the radial portion of the outer rotating ring;

said sheet metal brace comprising a first axial portion contacting said bore of said radial portion of said inner non-rotating ring, a radial portion extending from an end of the first axial portion and contacting said radial portion of said inner non-rotating ring, and a second axial portion extending from said radial portion and extending through at least a portion of the body of synthetic material; and said elastic sleeve element fitting entirely between a radial plane of contact of the diaphragm of the clutch device with the said outer rotating ring and a radial plane passing through the center of the rolling elements.

5. The device of claim 4, wherein the inner non-rotating ring is made by pressing of a metal sheet or a tube.

6. The device of claim 4, wherein the outer rotating ring is made by pressing of a metal sheet or a tube.

7. The device of claim 4, wherein the first and second central openings are substantially circular.

8. The device of claim 4, wherein said elastic sleeve element is made of a single piece comprised of said sheet metal brace, said body of synthetic material overmolded on said brace, and said sealing portion.

* * * * *